United States Patent
Castaldini et al.

(10) Patent No.: US 12,206,263 B2
(45) Date of Patent: Jan. 21, 2025

(54) METHOD FOR CONTACTLESS POWER TRANSMISSION BETWEEN A STATIONARY PART AND A MOVABLE PART, ELECTRICAL POWER SUPPLY CIRCUIT AND CONTACTLESS CONNECTION SYSTEM INCLUDING THE ELECTRICAL POWER SUPPLY CIRCUIT

(71) Applicant: Marposs Societa' Per Azioni, Bentivoglio (IT)

(72) Inventors: Davide Castaldini, Santa Maria Codifiume—Argenta (IT); Alessandro Ruggeri, Bologna (IT)

(73) Assignee: Marposs Societa' Per Azioni, Bentivoglio (IT)

( * ) Notice: Subject to any disclaimer, the term of this patent is extended or adjusted under 35 U.S.C. 154(b) by 56 days.

(21) Appl. No.: 18/257,928
(22) PCT Filed: Dec. 17, 2021
(86) PCT No.: PCT/EP2021/086456
§ 371 (c)(1),
(2) Date: Jun. 16, 2023
(87) PCT Pub. No.: WO2022/129504
PCT Pub. Date: Jun. 23, 2022

(65) Prior Publication Data
US 2024/0120779 A1    Apr. 11, 2024

(30) Foreign Application Priority Data
Dec. 18, 2020   (IT) .................. 102020000031361

(51) Int. Cl.
*H02J 50/90*     (2016.01)
*G01B 7/14*      (2006.01)
(Continued)

(52) U.S. Cl.
CPC ............... *H02J 50/90* (2016.02); *G01B 7/14* (2013.01); *H02J 50/12* (2016.02); *H02J 50/80* (2016.02)

(58) Field of Classification Search
None
See application file for complete search history.

(56) References Cited

U.S. PATENT DOCUMENTS 2,538,158 A    1/1951  Long
5,688,160 A   11/1997  Pozzetti et al.
(Continued)

FOREIGN PATENT DOCUMENTS

EP    1 870 198 A    12/2007
EP    2 421 121 A     2/2012
(Continued)

OTHER PUBLICATIONS

Miller G L et al., "Resonant Phase Shift Technique for the Measurement of Small Changes in Grounded Capacitors", Review of Scientific Instruments, American Institute of Physics, 2 Huntington Quadrangle, Melville, NY 11747, vol. 61, No. 4, doi: 10.1063/1.1141224, ISSN 0034-6748, pp. 1267-1272, XP000114720, Apr. 1, 1990.

(Continued)

*Primary Examiner* — Jared Fureman
*Assistant Examiner* — Aqeel H Bukhari
(74) *Attorney, Agent, or Firm* — Blank Rome LLP

(57) ABSTRACT

Method for contactless power transmission between a stationary part (14) and a movable part (15) and electrical power supply circuit (17) for implementing the method comprising an air-coupled transformer (19) provided with a primary resonant circuit with a primary coil (20) supported by the stationary part and a secondary resonant circuit with a secondary coil (21) facing the primary resonant circuit and supported by the movable part. The primary resonant circuit is fed with an alternating primary electrical voltage ($V_1$) which causes a primary electrical current ($I_1$) to circulate. The primary electrical current ($I_1$) induces in turn in the secondary resonant circuit an alternating secondary electrical voltage ($V_2$) which causes a secondary electrical current ($I_2$) to circulate. An electrical variable influencing the achievement of the resonance condition is adjusted, for (Continued)

example the frequency (F) of the primary electrical voltage, in such a way to operate in a resonance condition. The distance (d) between the stationary part and the movable part is determined as a function of a value of such electrical variable. A contactless connection system includes the stationary and movable parts and the electrical power supply circuit.

15 Claims, 5 Drawing Sheets

(51) Int. Cl.
    *H02J 50/12*     (2016.01)
    *H02J 50/80*     (2016.01)

(56) References Cited

U.S. PATENT DOCUMENTS

| | | | |
|---|---|---|---|
| 2012/0098348 A1* | 4/2012 | Inoue | B60L 50/61 |
| | | | 307/104 |
| 2012/0228954 A1* | 9/2012 | Kesler | H03H 7/40 |
| | | | 307/104 |
| 2013/0119930 A1* | 5/2013 | Sakoda | B60L 53/126 |
| | | | 320/108 |
| 2017/0031050 A1 | 2/2017 | Lisi | |
| 2020/0382113 A1 | 12/2020 | Beardsworth et al. | |

FOREIGN PATENT DOCUMENTS

| | | |
|---|---|---|
| WO | 94/21995 | 9/1994 |
| WO | 2015/162154 | 10/2015 |

OTHER PUBLICATIONS

Moore TD et al., "A capacitance displacement transducer with large dynamic range, good linearity and frequency read-out", Measurement Science and Technology, IOP, Bristol, GB, vol. 4, No. 12, doi:10.1088/0957-0233/4/12/034, ISSN 0957-0233, pp. 1519-1521, XP020065607.

Tapson J et al., "Improved capacitance measurement by means of resonance locking", Measurement Science and Technology, IOP, Bristol, GB, vol. 5, No. 1, doi: 10.1088/0957-0233/5/1/004, ISSN 0957-0233, pp. 20-26, XP020065613, Jan. 1, 1994.

* cited by examiner

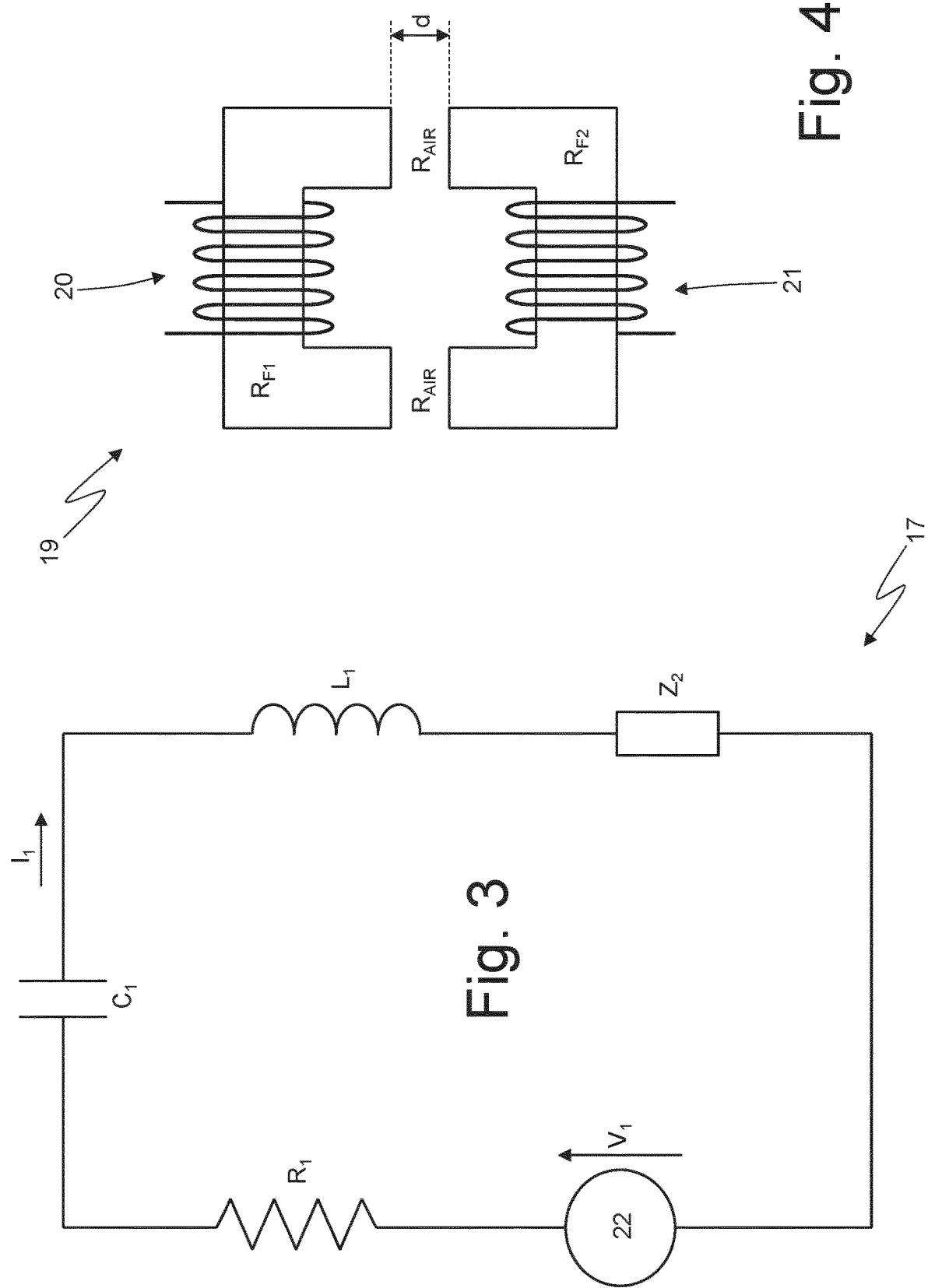

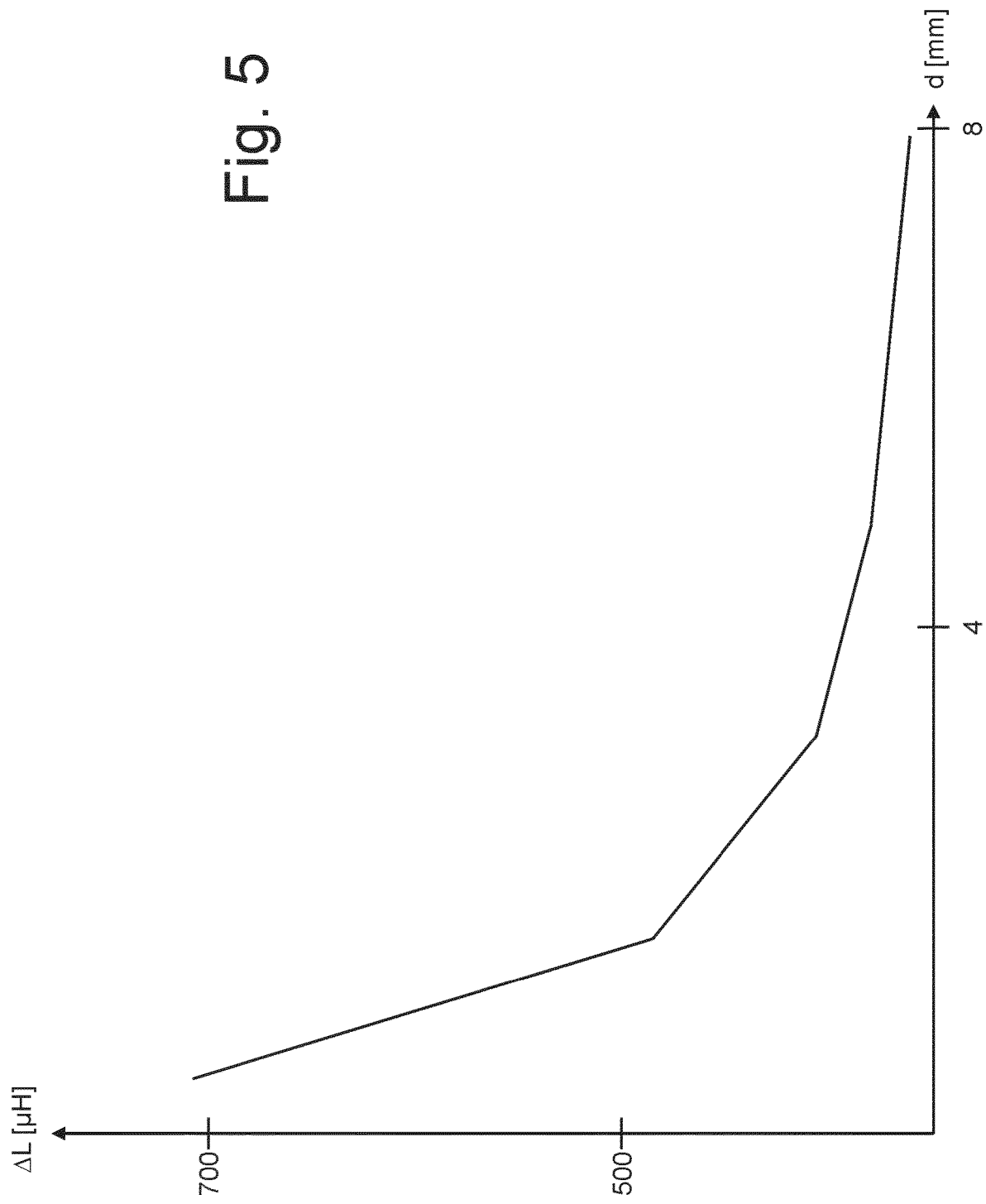

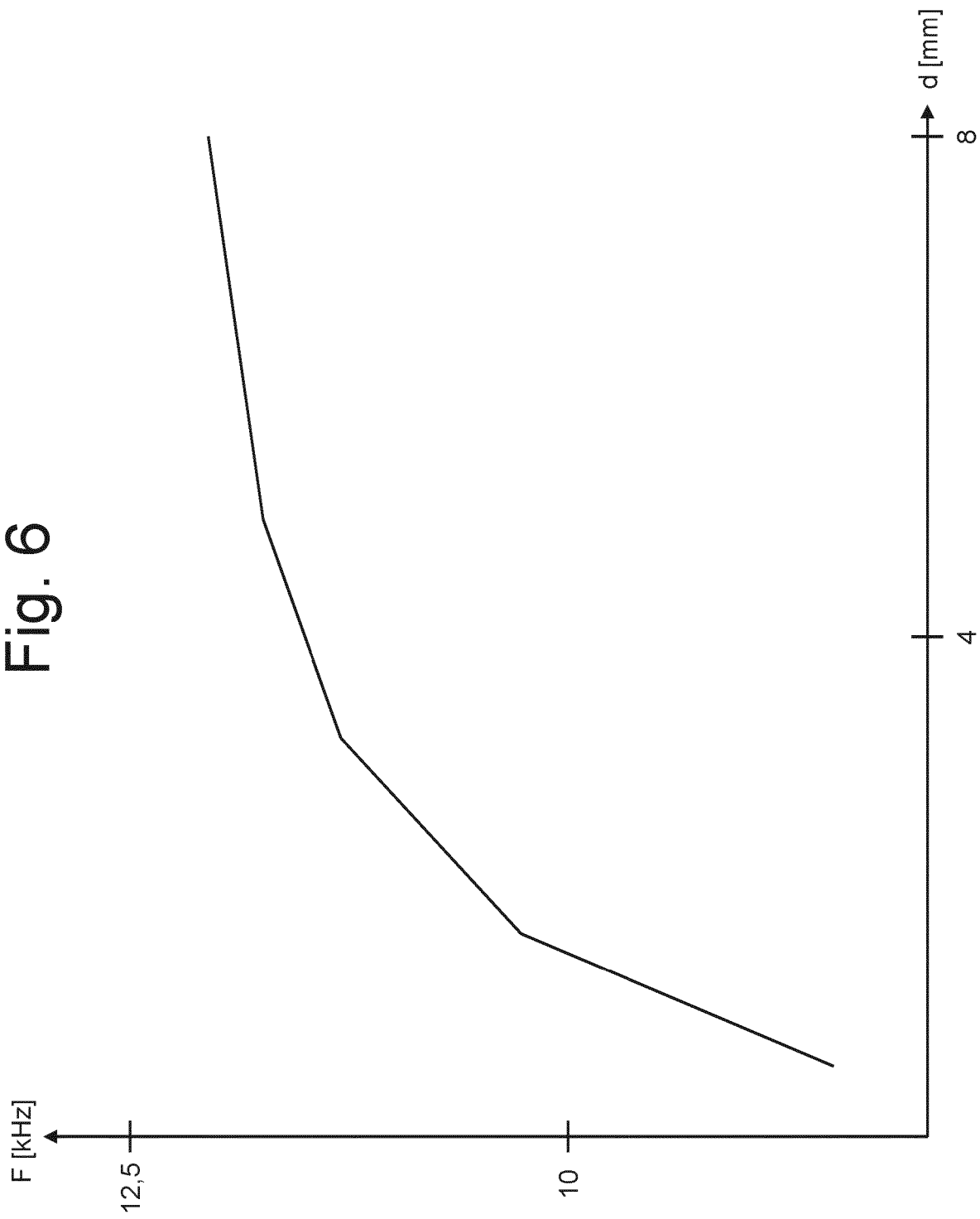

METHOD FOR CONTACTLESS POWER TRANSMISSION BETWEEN A STATIONARY PART AND A MOVABLE PART, ELECTRICAL POWER SUPPLY CIRCUIT AND CONTACTLESS CONNECTION SYSTEM INCLUDING THE ELECTRICAL POWER SUPPLY CIRCUIT

TECHNICAL FIELD

The present invention relates to a method for contactless power transmission and an electrical power supply circuit for the contactless transmission of electrical power between a stationary part and a movable part of a contactless connection system.

The present invention can advantageously be applied to a system for controlling the machining of a mechanical piece in a machine tool, in which a contactless connection system puts in communication a control unit and a balancing head mounted on a rotating spindle which supports (at least) a grinding wheel, to which the following discussion will make explicitly reference without losing generality.

The present invention can also be applied to a control system without a balancing head and comprising a vibration sensor, for example an acoustic sensor, and/or other sensors or devices in the movable part that need to be powered.

BACKGROUND ART

As described for example in patent applications No. EP0690979A1, EP1870198A1 and EP3134980A1, a rotating spindle (hub) of a machine tool (in particular a grinding machine) which supports (at least) a grinding wheel and is provided with a balancing head housed in an axial cavity is known. The balancing head includes at least one balancing mass eccentric with respect to the rotation axis, the position of which is adjustable and is controlled by an electric motor.

Generally, the balancing head also comprises a vibration sensor (i.e. a microphone) for detecting the ultrasonic acoustic emissions caused by the contact between the grinding wheel and the workpiece or between the grinding wheel and a dressing tool (dresser). The electrical signals generated by the vibration sensor are used (in a known way) to control the machining cycles.

There is a two-way contactless communication system that transmits analog and digital information between the balancing head mounted on the spindle and a control unit placed in a fixed position. In particular, the communication system is used by the control unit to send digital control signals to the balancing head (for example to activate/deactivate the reading of the vibration sensor or to control the electric motors that move the balancing masses) and is used in the opposite direction by the balancing head to send digital diagnostic signals and the analogue reading of the vibration sensor to the control unit.

A contactless power transmission system provides the necessary power supply to the balancing head. Generally, the power transmission system comprises an air-coupled transformer which has the primary coil arranged in an element (stator) integral with a stationary part of the machine, and the secondary coil arranged in an element (rotor) integral with a movable part of the machine, for example the rotating spindle. Between the two coils of the air-coupled transformer there is a distance (usually a few millimeters, for example between 1 and 8 mm) which must be neither too small (in order to avoid the risk that the rotor is touched by the stator when the spindle is rotated, for example due to thermal expansion of the spindle, and that both are damaged), nor too large (in order to prevent the air-coupled transformer from being unable to transfer sufficient electrical power to the rotor because of the too large air gap). Generally, at the design stage for each balancing system a range of distance between stator and rotor (i.e. the distance between the two coils of the air-coupled transformer) which must be complied with for correct operation can be defined.

After the spindle has been mounted (typically after maintenance or repair), the distance between the stator and the rotor must be measured with sufficient accuracy to ensure that it is within the range defined at the design stage. However, the manual measurement of the distance between stator and rotor is not always easy to carry out as there may be protective casings that block access with an external manual gauge.

Also during the machine operation it is useful to monitor and measure cyclically and with sufficient accuracy the distance between stator and rotor to ensure that it is within the range defined at the design stage, In fact, the rotor and stator could move closer than the condition set at the installation stage due to thermal expansion of the spindle. Or, when the grinding wheel is replaced due to wear or retooling for different processes, the wheel support could have a different thickness and cause a change in the distance between rotor and stator.

For these reasons, a "contactless" electronic measuring device (for example a laser measuring device) or one or more sensors that can measure the distance between stator and rotor may be installed on the stator. However, this installation results in an increase in costs and dimensions and can cause problems in some applications where the space available is very limited.

DISCLOSURE OF THE INVENTION

The object of the present invention is to provide a method for contactless power transmission between a stationary part and a movable part, for example a rotating part, an electrical power supply circuit that allow to easily monitor the distance between such stationary and a movable parts, and a contactless connection system including said circuit, the method and circuit allowing to determine the distance with sufficient accuracy and without significant increases in cost and space.

The present invention provides a method for contactless power transmission, an electrical power supply circuit and a contactless connection system including such a circuit, as defined in the attached claims.

The claims describe embodiments of the present invention and form an integral part of the present description.

BRIEF DESCRIPTION OF THE DRAWINGS

The present invention is described with reference to the attached drawings, which illustrate non-limiting examples of embodiment, in which:

FIG. 3 schematically shows an equivalent electrical circuit referred to the primary side corresponding to the electrical power supply circuit shown in FIG. 2;

FIG. 4 is a schematic diagram of an air-coupled transformer of the electrical power supply circuit of FIG. 2;

FIG. 5 is a graph showing how the inductance referred to the primary side in the electrical power supply circuit of FIG. 2 varies as a distance between a rotor and a stator of a connection system varies; and FIG. 6 is a graph showing how the resonance frequency in the electrical power supply circuit of FIG. 2 varies as the distance between a rotor and a stator of a connection system varies.

BEST MODE FOR CARRYING OUT THE INVENTION

Figure 1:
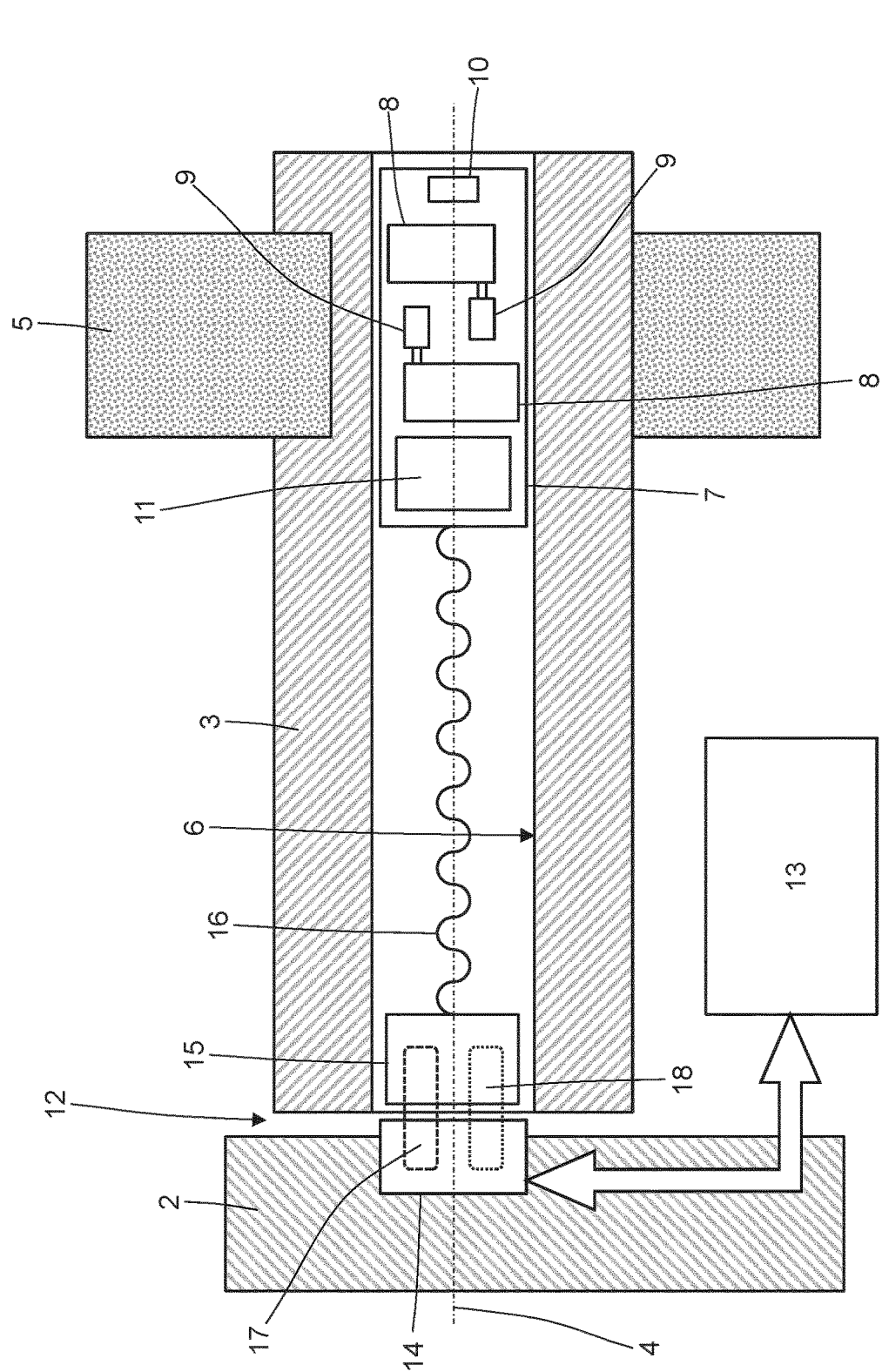
FIG. 1 schematically shows a machine tool comprising a frame, a rotating spindle, which supports a grinding wheel and is equipped with a balancing head, and a contactless connection system.

In FIG. 1, the reference number 1 indicates as a whole a machine tool (in particular a grinding machine), only some components of which are shown.

The machine tool 1 comprises a frame 2 which supports in a rotatable way (by means of bearings arranged therebetween) a rotating spindle 3 which rotates about a rotation axis 4.

The spindle 3 supports a grinding wheel 5 by means of a corresponding grinding wheel hub which is fixed to the spindle 3 in a removable way using known and not illustrated means and comprising, for example, a cone coupling. The spindle 3 has in the center an axial opening 6. A balancing head 7 is connected to the spindle 3 and can rotate with it, more specifically the balancing head 7 is housed in the axial opening 6. The balancing head 7, of a known type, comprises two balancing masses 8 which are eccentric with respect to the rotation axis 4, and relative electric motors 9 for adjusting the angular position of the balancing masses 8. In the balancing head 7 is also housed an acoustic sensor 10, or vibration sensor.

Typically, the function of the balancing head 7 is to balance the grinding wheel 5 (this operation is carried out whenever the grinding wheel 5 is replaced and when it is necessary as a result of the wear of the grinding wheel 5), while the acoustic sensor 10 housed in the balancing head 7 allows to perform a process monitoring.

The balancing head 7 comprises a control device 11 which controls the operation of the balancing head 7 and of the acoustic sensor 10.

A contactless connection system 12 is provided and has a dual function: it supplies electrical power to the balancing head 7 and enables a two-way communication to transmit analogue and digital information between the control system 11 of the balancing head 7 mounted on the spindle 3 and a control unit 13 connected to the frame 2 of the machine tool 1 and arranged between the contactless connection system 12 and the numerical control of the machine tool 1 (not shown in the figure).

The contactless connection system 12 comprises a stationary part 14, or stator, mounted on the frame 2 of the machine tool 1 which is connected by means of a cable to the control unit 13 and a movable part, preferably a rotating part 15, or rotor mounted on the spindle 3 which is connected to the balancing head 7 by means of, for example, a coiled electric cable 16 running along the axial opening 6. Furthermore, the contactless connection system 12 comprises an electrical power supply circuit 17 (partly arranged in the stator 14 and partly arranged in the rotor 15) which transmits electrical power to the balancing head 7 and a communication device 18 (partly arranged in the stator 14 and partly arranged in the rotor 15) preferably of the optical type (for example according to one of the alternatives described in U.S. Pat. No. 5,688,160A).

The communication device 18 is used by the control unit 13 to send control signals (for example to activate/deactivate the reading of the acoustic sensor 10 or to control the electrical motors 9 displacing the balancing masses 8 of the balancing head 7) to the control device 11 of the balancing head 7, and it is used in the opposite direction by the control device 11 of the balancing head 7 to transmit to the control unit 13 diagnostic signals and/or signals provided by the acoustic sensor 10 and relating to vibrations to which the spindle is subjected.

Figure 2:
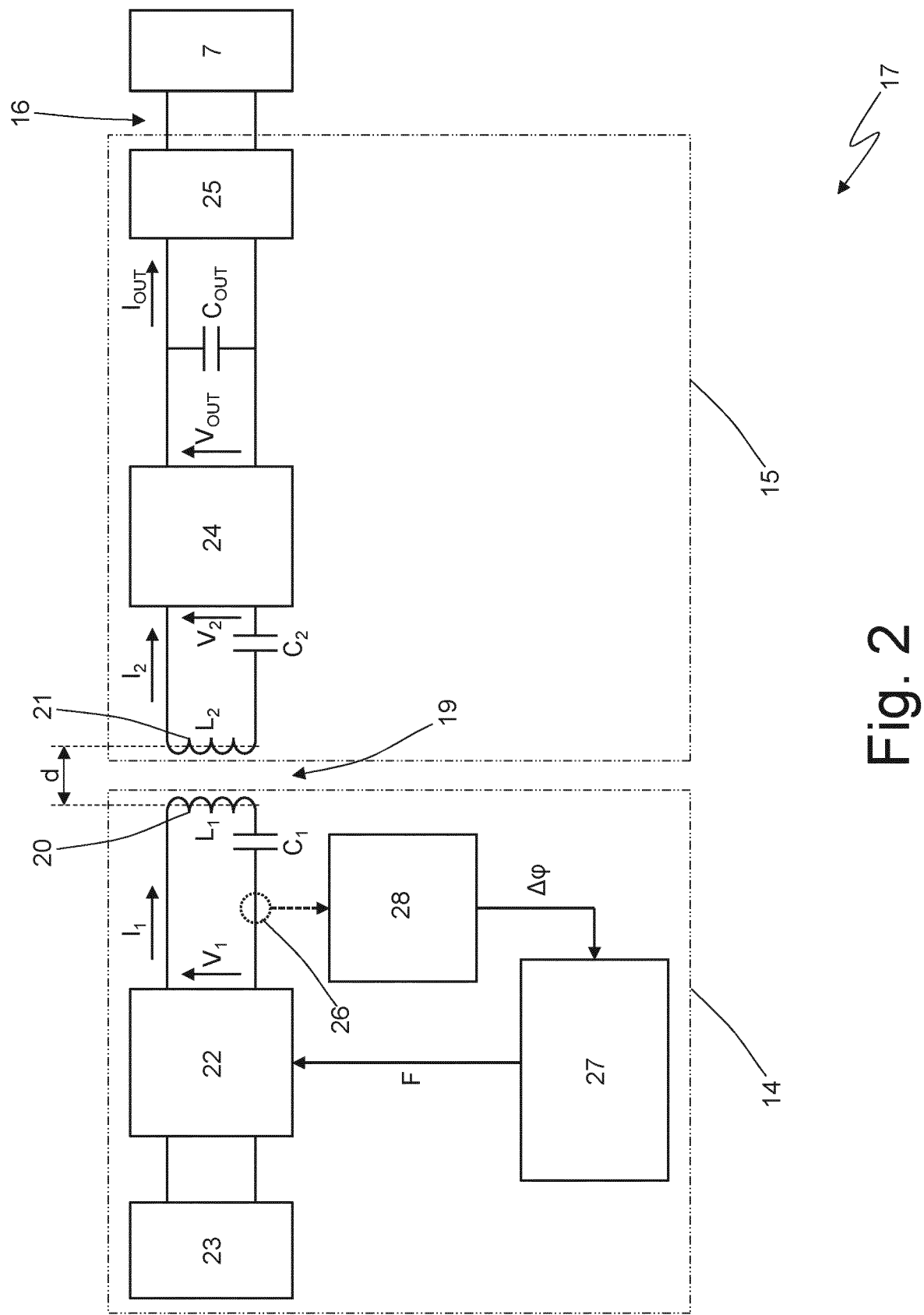
FIG. 2 schematically shows an electrical power supply circuit according to the invention that is part of the contactless connection system shown in FIG. 1.

As shown in FIG. 2, the electrical power supply circuit 17 comprises an air-coupled transformer 19 (shown in more detail in FIG. 4) which has a primary coil 20 with inductance $L_1$ arranged in the stator 14 and a secondary coil 21 with inductance $L_2$ which is arranged in the rotor 15 and is coupled magnetically to the primary coil 20 (i.e. the magnetic field generated by the primary coil 20 is linked to the secondary coil 21). Between the two coils 20 and 21 there is a distance d (normally a few millimeters, for example between 1 and 8 mm) which must be neither too small (in order to avoid the risk that the rotor 15 is touched by the stator 14 when the spindle 3 is rotated, for example due to thermal expansion of the spindle, and that both are damaged), nor too large (in order to prevent the air-coupled transformer 19 from being unable to transfer sufficient electrical power to the rotor 15 because of the too large air gap).

A primary resonant circuit includes the primary coil 20 and a first capacitor with capacitance $C_1$, which are connected in series. Similarly, a secondary resonant circuit includes the secondary coil 21 and a second capacitor with capacitance $C_2$, which are connected in series. Resonant circuit means a circuit that is adapted to operate in resonance conditions. In particular, the primary and secondary resonant circuits are series resonant circuits.

Alternatively, it is possible to use resonant circuits of different types, for example parallel resonant circuits or a combination of series and parallel resonant circuits.

The electrical power supply circuit 17 also comprises an inverter 22 which receives direct current electrical energy from a power supply device 23 and applies to the primary resonant circuit a primary alternating electrical voltage $V_1$ which has a variable frequency F and causes the circulation of a primary electrical current $I_1$.

The electric current $I_1$ which circulates in the primary resonant circuit induces in the secondary resonant circuit a secondary alternating electrical voltage $V_2$ which has the same variable frequency F as the primary electrical voltage $V_1$ and causes the circulation of a secondary electric alternating current $I_2$.

According to a preferred embodiment, the electrical power supply circuit 17 comprises a diode rectifier 24 that transforms the secondary alternating electrical voltage $V_2$ and the secondary alternating electrical current $I_2$ into a corresponding direct voltage $V_{OUT}$ and into a corresponding direct current $I_{OUT}$. The rectifier 24 supplies a DC/DC electronic power converter 25 to which the balancing head 7 is connected (through the electric cable 16).

Preferably, a capacitor with stabilization capacitance $C_{OUT}$ is connected in parallel to the rectifier 24 to stabilize the voltage $V_{OUT}$ (i.e. reduce the ripple of the $V_{OUT}$). Alternatively, the function performed by the capacitor with capacitance $C_{OUT}$ can be integrated into the rectifier 24.

A sensor device 26 is connected to the primary resonant circuit and detects a phase shift Δφ between the primary electrical voltage $V_1$ and the primary electrical current $I_1$. Preferably, the sensor device 26 is itself connected to a signal conditioning device, represented in FIG. 2 in a very schematic way by box 28.

Finally, the electrical power supply circuit 17 comprises a controller 27 which receives the phase shift Δφ between the primary electrical voltage $V_1$ and the primary electrical current $I_1$ as input, and controls the inverter 22 in such a way as to adjust the frequency F of the primary electrical voltage $V_1$ (therefore of the primary electric current $I_1$) depending on the phase shift Δφ between the primary electrical voltage $V_1$ and the primary electric current $I_1$.

In operation, the controller 27 varies the frequency F of the primary electrical voltage $V_1$ (therefore of the primary electrical current $I_1$) in such a way as to cancel the phase shift Δφ between the primary electrical voltage $V_1$ and the primary electrical current $I_1$, i.e. in such a way as to operate in resonance condition (in which the capacitive impedance is equal to the inductive impedance and therefore the primary electrical voltage $V_1$ is perfectly in phase with the primary electric current $I_1$). The value of the frequency F at which the resonance condition occurs is called the resonance frequency $F_R$.

It should be noted that the controller 27 adjusts the frequency F of the primary electrical voltage $V_1$ to follow the resonance condition (i.e. to identify the resonance frequency $F_R$ which cancels the phase shift Δφ between the primary electrical voltage $V_1$ and the primary electrical current $I_1$) in a substantially continuous way (i.e. always, dynamically). When the distance d between the stator 14 and the rotor 15 must be measured or monitored, this distance is obtained from the frequency set to maintain the resonance condition, that is from the resonance frequency $F_R$.

FIG. 3 schematically shows an equivalent electrical circuit referred to the primary side corresponding to the electrical power supply circuit 17 of FIG. 2. Such circuit comprises the inverter 22 which generates the primary electrical voltage $V_1$, an electrical resistance $R_1$ (corresponding to the parasitic electrical resistance of the inverter 22 and of the primary coil 20), the capacitance $C_1$, the inductance $L_1$ of the primary coil 20, and the impedance $Z_2$ corresponding to the secondary coil 21 and to everything that is connected to the secondary coil 21 referred to the primary side.

Assuming that:

$$L_1 = n^2 * L_2$$

$$C_1 = C_2/n_2$$

where n is the turns ratio between the two coils 20 and 21 and can also take the unitary value,
the impedance $Z_2$ is equal to:

$$Z_2 = \frac{(\omega \cdot M)^2}{R_L}$$

where ω is the angular pulsation, M is the mutual inductance value between the two coils and $R_L$ is the load resistance.

The resonance condition occurs when:

$$\omega = \frac{1}{\sqrt{L_1 \cdot C_1}}.$$

$L_1$ is the inductance of the primary coil 20 and depends on the characteristics of the primary coil 20 (i.e. the number N of turns) and of the magnetic circuit of the air-coupled transformer 19 (schematically shown in FIG. 4). Such magnetic circuit has an overall magnetic reluctance ℜ which varies by changing the distanced between the stator 14 and the rotor 15:

$$L_1 = \frac{N^2}{\Re}$$

From the schematic representation of the magnetic circuit of the air-coupled transformer shown in FIG. 4, it is possible to deduce that:

$$\Re = R_{F1} + R_{F2} + 2 \cdot R_{AIR}$$

$$R_{F1} = \frac{l}{S \cdot \mu_{f1}}$$

$$R_{F2} = \frac{l}{S \cdot \mu_{f2}}$$

$$R_{AIR} = \frac{d}{S \cdot \mu_{air}}$$

The magnetic permeabilities of the ferrite cores F1 and F2 on which the coils 20 and 21 are wound are much greater than the magnetic permeability of the air, therefore the overall magnetic reluctance ℜ mainly depends on the magnetic reluctance $R_{AIR}$ of the air gap.

Since the magnetic reluctance $R_{AIR}$ of the air gap is proportional to the distance d between the stator 14 and the rotor 15, it is possible to deduce that the inductance $L_1$ of the primary coil 20 is inversely proportional to the distance d. In turn, the resonance frequency $F_R$ of the primary circuit is proportional to the square root of the distance d between the stator 14 and the rotor 15 (i.e. between the two coils 20 and 21).

In conclusion, knowing the value of an electrical variable influencing the achievement of the resonance condition, such as the resonance frequency $F_R$, it is possible to determine the distance d between the stator 14 and the rotor 15 (i.e. between the two coils 20 and 21). Therefore, it is possible to monitor, and more specifically to measure or determine, the distance d between the stationary part 14 and the movable part 15 without the need of any external probe or device, but by means of a measuring system including the processing unit that detects a value of the frequency influencing the achievement of the resonance condition (i.e. the frequency of resonance $F_R$) and determines the distance d as a function of such value of the frequency. More specifically, the controller 27 adjusts the frequency F of the primary electric voltage $V_1$ in such a way that the primary circuit operates in a resonance condition (in which the primary electrical voltage $V_1$ is in phase with the primary electric current $I_1$). A processing unit, for example the control unit 13, detects a value taken by the frequency F of the primary electrical voltage $V_1$, that is the resonance frequency $F_R$, and determines the distance d between the stator 14 and the rotor 15 depending on such value.

The processing unit, which receives the information of the resonant frequency $F_R$ and determines the distance d between the stator 14 and the rotor 15, can be included in the control unit 13 as described and shown in the figure, or it can be integrated into the controller 27 so as to ease processing operations carried out by the control unit 13.

It is possible to monitor, and more specifically to measure or determine, the distance d between the stator 14 and the rotor 15 without the need of any external probe or device, starting from an electrical variable other than the frequency, in any case an electrical variable that influences the achievement of the resonance condition, such as the overall inductance or the overall capacitance referred to the primary resonant circuit.

Overall inductance and overall capacitance mean the inductance or capacitance (depending on which physical quantity is considered) referred to the primary resonant circuit which are modified to achieve the resonance condition. In particular, the inductance or capacitance values of the primary resonant circuit can be adjusted in a known way to operate in resonance conditions by using a suitable circuitry.

The processing unit, included for example in the control unit 13, determines, when operating in a resonance condition, the distance d between the stator 14 and the rotor 15 as a function of a value ($F_R$) taken by the frequency F or by the overall inductance or by overall capacitance both referred to the primary resonant circuit.

In conclusion, knowing the resonant frequency $F_R$ or the value of another electrical variable that influences the achievement of the resonance condition, such as the overall inductance or the overall capacitance referred to the primary resonant circuit, it is possible to determine the distance d between the stator 14 and rotor 15 (i.e. between the two coils 20 and 21).

According to the preferred embodiment, the achievement of the resonance condition, and the measurement of the distance between the stator 14 and the rotor 15, are carried preferably on the basis of the frequency as it is the most advantageous solution in terms of simplicity of application, of the necessary circuitry and therefore of dimensions and costs. Capacitance and inductance can also be used to achieve the resonance condition and thus to determine the distance between the stator 14 and the rotor 15, even if acting on one of these electrical variables is more complex when the system is in operation, and entails larger dimensions and higher costs.

It is also possible to act simultaneously on several electrical variables, even if this solution is more complex.

According to a preferred embodiment, an experimental law is used (shown for example in FIGS. 5 and 6) which links the distance d between the stator 14 and the rotor 15 and the value taken by the electrical variable influencing the achievement of the resonance condition. In other words, it expresses the distance d as a function of the frequency F (FIG. 6) or as a function of the overall inductance $L_1$ (FIG. 5) or of the overall capacitance of the primary resonant circuit (FIG. 5). The experimental law is obtained, for example, from appropriate tests previously carried out.

The information of the resonant frequency $F_R$ (and/or of the other electrical variables) is in the controller 27. The controller 27 can make it available through registers that can be read by the logic circuits of the control unit 13 of the machine tool 1, the control unit 13 dealing with the corresponding signaling.

Due to tolerances set for inductive components and capacitances, this technique may require a calibration phase to provide absolute distance measurements. However, this calibration should concern only the stator 14 with the advantage that if the rotor 15 is replaced on site it is not necessary to repeat the calibration. This applies to cases where the new rotor 15 does not have values of inductance $L_2$ and capacitance $C_2$ very different from those nominally expected.

A possible limitation of this technique concerns the phenomenon known in literature as "Frequency splitting" consisting in a resonance frequency splitting in an "overcoupled" system condition. The "overcoupling" condition is reached when the electrical resistance of the load (i.e. the equivalent electrical resistance of the balancing head 7) becomes particularly small while mutual inductance values are relatively high. To avoid this problem, the controller 27 is designed in such a way as to remain locked to the resonance peak with a lower frequency in the event of resonance frequency splitting, that is when operating in "overcoupling" condition, in order to avoid frequency jumps.

As a consequence, given the type of control carried out, should the "overcoupling" condition arise, the resonance frequency chosen by the system would be lower than the nominal value determined exclusively by the values of the inductance $L_1$ and the capacitance $C_1$.

In general, in order to minimize the effects that the frequency shift has on the determination of the distance d, it is preferable to carry out the evaluation in a light load condition (i.e. a condition of high electrical resistance of the load). In fact in this condition the resonance frequency depends only on the reluctance $\Re$ of the air-coupled transformer 19 as previously described. In other words, the measurement of the distance d is preferably carried out when the balancing head 7 is not operating (i.e. it is switched on in a standby condition) and therefore provides a modest electrical load.

If the measurement of the distance d is carried out in heavy load conditions (that is, a condition of low electrical resistance of the load) and high mutual inductance values, which can be obtained when the distance d is small, the measurement of the distance d might be underestimated. That would be however the safest situation, when the distance d between the stator 14 and the rotor 15 is small.

FIG. 5 shows a diagram which has been obtained experimentally and shows the correlation between the distance d and the overall inductance (indicated with $\Delta L$) referred to the primary resonant circuit once the condition of resonance has been reached.

FIG. 6 shows a diagram which has been obtained experimentally and shows the correlation between the distance d and the frequency F of the primary electrical voltage $V_1$.

FIG. 2 shows a preferred embodiment of the electrical power supply circuit 17. This circuit can be made in a different way according to the type of electronics that is used, for example the rectifier device 24 and the converter 25 can be omitted.

In the experimental tests that have been carried out, the "overcoupling" phenomenon rarely occurs even with heavy loads. Its presence begins to appear when the rotor and stator are in close proximity. In this case, in fact, the measured frequency F slightly decreased as compared with the expected one but, as previously mentioned, the error committed would be estimating a distance d smaller than the real one. This would thus provide a more precautionary result to avoid unwanted contacts between the stator 14 and the rotor 15.

In the embodiment shown in the attached figures, the above described method for contactless power transmission is implemented in a contactless connection system 12 which, in a machine tool 1, connects a control unit 13 to a balancing head 7 of a rotating spindle 3, the latter supporting (at least)

one grinding wheel 5. According to other embodiments not shown, the above described method can be implemented in a contactless connection system mounted on a different type of application.

The method for contactless power transmission and the electrical supply circuit are so far described and illustrated with reference to a system for controlling the machining of a mechanical part in a machine tool comprising a balancing head. They can also be applied to a control system without a balancing head and comprising a vibration sensor, for example an acoustic sensor, and/or other per se known sensors or devices in a movable/rotating part that need to be powered.

The embodiments described herein can be combined with each other without departing from the scope of protection of the present invention.

The method and the circuit described above provide several advantages.

In the first place, the method and circuit described above allow to measure the distance d with sufficient accuracy (i.e. the measurement of the distance d between the stator 14 and the rotor 15 is sufficiently accurate for the specific requirements of this type of application). In particular, the method and circuit described above are particularly accurate when a high accuracy is required, that is when the distance d is smaller and the risk of accidental and potentially destructive contacts between the stator 14 and the rotor 15 is greater.

Furthermore, the method and circuit described above do not entail a significant increase in cost and space, as the actual value of the distance d can be determined without requiring any hardware elements in addition to those already present and without involving the rotor 15 or the communication protocol used by the communication device 18 in the measurement.

Furthermore, the method and the circuit described above are extremely flexible, since they can be easily customized and adapted to variations in the geometries of the rotor 15 and stator 14 according to the application requirements.

Finally, thanks to the method and circuit described above, it is possible to introduce an important diagnostic function without affecting the overall dimensions of rotor 15 and stator 14.

The invention claimed is:

1. A method for contactless power transmission between a stationary part and a movable part, with an electrical power supply circuit comprising an air-coupled transformer provided with a primary resonant circuit with a primary coil supported by the stationary part and a secondary resonant circuit with a secondary coil facing the primary resonant circuit and supported by the movable part;

the method comprising the steps of
feeding the primary resonant circuit with a primary alternating electrical voltage causing a primary electrical current to circulate, said primary electrical current inducing in the secondary resonant circuit a secondary alternating electrical voltage that causes a secondary electrical current to circulate;
adjusting at least one electrical variable influencing the achievement of a resonance condition wherein the primary electrical voltage is in phase with the primary electrical current; and
monitoring the distance (d) between the stationary part and the movable part,
wherein the step of monitoring the distance between the stationary part and the movable part comprises:
detecting a value of said at least one electrical variable influencing the achievement of the resonance condition; and
determining said distance between the stationary part and the movable part as a function of the value of said at least one electrical variable.

2. The method according to claim 1, wherein the step of determining the distance includes using an experimental law linking the distance between the stationary part and the movable part and the value of the at least one electrical variable influencing the achievement of the resonance condition.

3. The method according to claim 1, wherein said at least one electrical variable is the frequency of the primary electrical voltage, the resonance condition being achieved at a resonance frequency.

4. The method according to claim 3, wherein:
a sensor device detecting a phase shift between the primary electrical voltage and the primary electrical current is connected to the primary resonant circuit; and
a controller is provided, said controller receiving as input the phase shift between the primary electrical voltage and the primary electrical current and controlling an inverter to adjust the frequency of the primary electrical voltage so as to operate in a resonance condition in which the primary electrical voltage is in phase with the primary electrical current.

5. The method according to claim 3, wherein, in cases of resonance frequency splitting, the frequency of the primary electrical voltage is adjusted to detect and follow a resonance peak with a lower frequency.

6. The method according to claim 1, wherein said at least one electrical variable is an overall inductance referred to the primary resonant circuit.

7. The method according to claim 1, wherein the distance between the stationary part and the movable part is determined when an electrical load coupled to the electrical power supply circuit has a minimum electrical power consumption.

8. The method according to claim 1, for supplying electrical power to a balancing head that is connected to a rotating spindle of a machine tool and rotates with it, wherein said stationary part and said movable part are adapted to be mounted on a frame of the machine tool and on said rotating spindle, respectively.

9. An electrical power supply circuit for the contactless transmission of electrical power between a stationary part and a movable part; comprising
an air-coupled transformer provided with a primary resonant circuit with a primary coil supported by the stationary part and a secondary resonant circuit with a secondary coil facing the primary resonant circuit and supported by the movable part, the primary resonant circuit being fed with a primary alternating electrical voltage causing a primary electrical current to circulate, said primary electrical current inducing in the secondary resonant circuit a secondary alternating electrical voltage that causes a secondary electrical current to circulate; and
a controller configured to adjust at least one electrical variable influencing the achievement of a resonance condition wherein the primary electrical voltage is in phase with the primary electrical current;
the electrical power supply circuit comprising a measuring system for measuring the distance between the stationary part and the movable part with a processing unit configured to detect a value of said at least one electrical variable influencing the achievement of the resonance condition and to determine the distance between the stationary part and the movable part as a function of the value of said at least one electrical variable.

10. The electrical power supply circuit according to claim 9, further including:
a sensor device connected to the primary resonant circuit and adapted to detect a phase shift between the primary electrical voltage and the primary electrical current, and
an inverter that receives electrical power in direct current and applies to the primary resonant circuit the primary alternating electrical voltage,
said controller being adapted to receive as input the phase shift between the primary electrical voltage and the primary electrical current and to control the inverter to adjust the frequency of the primary electrical voltage so as to operate in a resonance condition in which the primary electrical voltage is in phase with the primary electrical current.

11. The electrical power supply circuit according to claim 9, further comprising:
a rectifier device converting the secondary alternating electrical voltage to a corresponding voltage, and
an electronic DC-to-DC power converter which at one side is connected to the rectifier device and at the other side powers an electrical load.

12. The electrical power supply circuit according to claim 9, wherein the primary resonant circuit comprises a first capacitor connected in series to the primary coil.

13. The electrical power supply circuit according to claim 9, wherein the secondary resonant circuit comprises a second capacitor connected in series to the secondary coil.

14. A contactless connection system for a machine tool, including the electrical power supply circuit according to claim 9, and comprising said stationary part and said movable part that are adapted to be mounted to a frame and to a rotating spindle, respectively, of the machine tool.

15. The contactless connection system according to claim 14, further comprising a communication device between said stationary part and said movable part.

* * * * *